Figure 1:
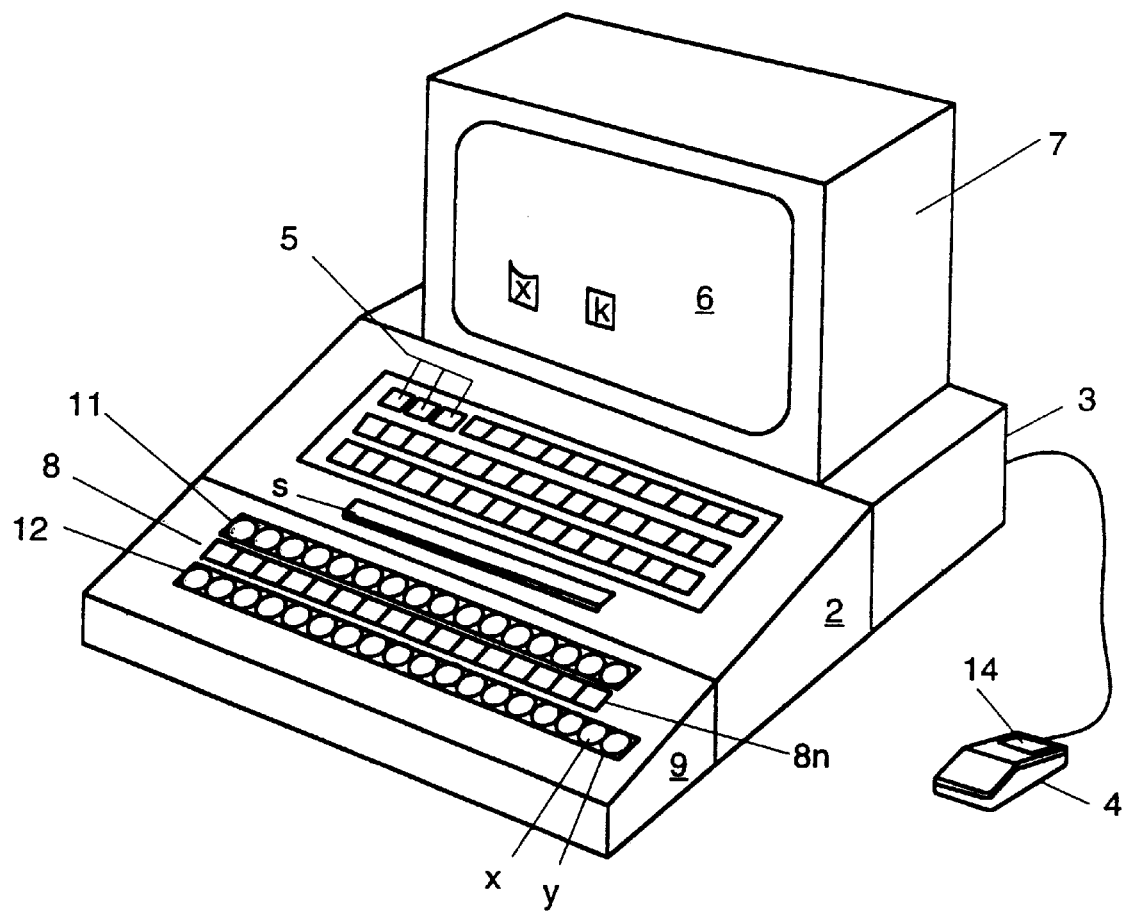

United States Patent
Breider

[19]

[11] Patent Number: 6,163,280
[45] Date of Patent: Dec. 19, 2000

[54] WORKSTATION COMPRISING A BRAILLE READING LINE

[75] Inventor: Jakob Breider, Arnhem, Netherlands

[73] Assignee: Alva B.V., Arnhem, Netherlands

[21] Appl. No.: 09/051,954

[22] PCT Filed: May 1, 1997

[86] PCT No.: PCT/NL96/00412

§ 371 Date: Jul. 8, 1998

§ 102(e) Date: Jul. 8, 1998

[87] PCT Pub. No.: WO97/15909

PCT Pub. Date: May 1, 1997

[30] Foreign Application Priority Data

Oct. 24, 1995 [NL] Netherlands ............................ 1001493

[51] Int. Cl.[7] .................................................. H03M 11/00
[52] U.S. Cl. ................................ 341/21; 341/20; 341/22; 340/825.19; 340/407.2; 345/168; 434/112; 434/113; 434/115
[58] Field of Search .................................. 341/20, 21, 22; 345/168, 157, 158, 160; 340/825.19, 407.2; 434/112, 113, 115

[56] References Cited

U.S. PATENT DOCUMENTS

| | | | |
|---|---|---|---|
| 4,985,692 | 1/1991 | Breider | 340/407.2 |
| 5,186,629 | 2/1993 | Rohen | 340/825.19 |
| 5,223,828 | 6/1993 | McKiel | 341/21 |
| 5,374,924 | 12/1994 | McKiel | 341/21 |
| 5,719,561 | 2/1998 | Gonzales | 340/825.19 |
| 5,808,922 | 9/1998 | Martinez | 345/168 |

FOREIGN PATENT DOCUMENTS

| | | |
|---|---|---|
| 640 948 A1 | 8/1994 | European Pat. Off. . |
| 2655911 | 6/1991 | France . |
| 2701132 | 8/1994 | France . |
| 9400699 | 1/1994 | Germany . |
| 6332595 | 2/1994 | Japan . |

OTHER PUBLICATIONS

Kieninger & Kuhn, Hyperbraille—A Hypertext System for the Blind, Annual Conference on Assistive Technologies, Los Angeles, Oct. 31, 1994, pp. 92–99.

IBM Technical Disclosure Bulletin, *Braille Terminal Window*, vol. 36, No. 9B, Sep. 1, 1993, p. 503–504.

Primary Examiner—Michael Horabik
Assistant Examiner—Albert K. Wong
Attorney, Agent, or Firm—Welsh & Katz, Ltd.

[57] ABSTRACT

A workstation comprising a keyboard for inputting data, a braille reading line having a number of braille cells located side by side, and a first switch device comprising a number of switch elements located side by side, wherein the first switch device is arranged in or parallel to the braille reading line, and wherein the workstation further comprises a second switch device comprising number of switch elements located side by side, wherein the second switch device is arranged in or parallel to the braille reading line, so that the first and the second switch device can each be operated by a visually handicapped person without the orientation of the hand relative to a braille cell of the braille reading line being lost.

25 Claims, 2 Drawing Sheets

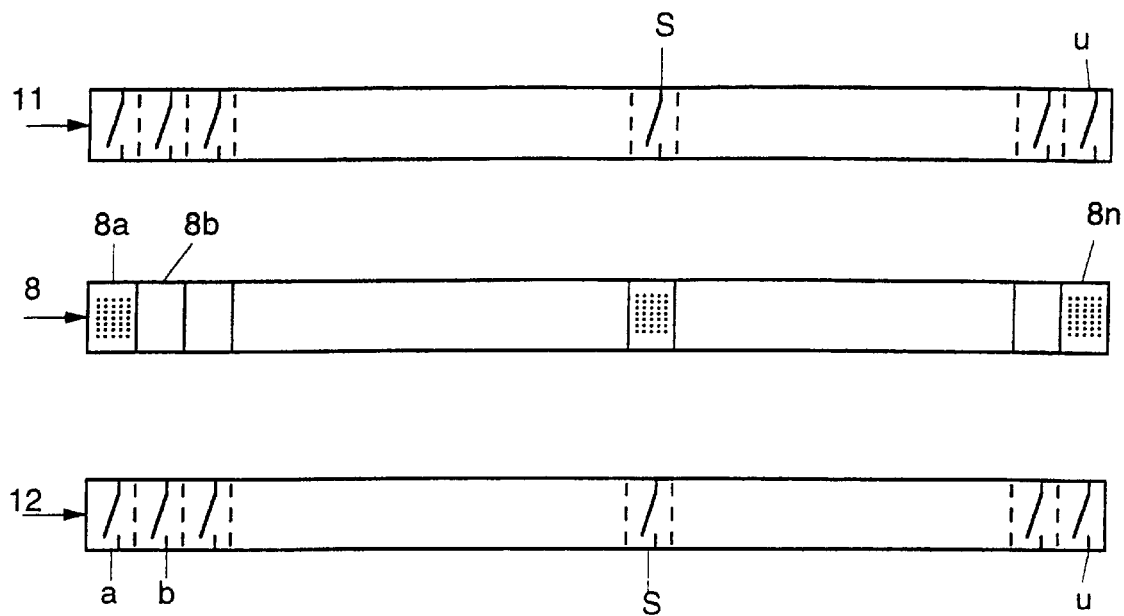
Fig. 2
(Prior Art)   Fig. 3
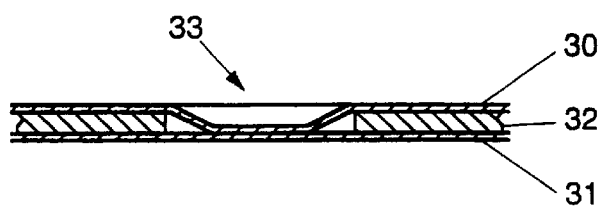
(Prior Art)   Fig. 4

WORKSTATION COMPRISING A BRAILLE READING LINE

The invention relates to a workstation comprising a keyboard for inputting data, a braille reading line having a number of braille cells located side by side, and a first switch device comprising a number of switch elements located side by side, the first switch device being arranged in or parallel to the braille reading line.

A braille reading line is a strip-shaped configuration of feeler members, for instance pins, which are arranged in cells and can be moved up and down, and which can form braille signs.

Such braille reading lines are used for providing visually handicapped persons with information which is stored in a manner that is hardly accessible, if at all, to visually handicapped persons, such as for instance information displayed on a screen.

A workstation comprising a braille reading line can for instance be a computer terminal or a word processing device which is conventionally provided with a keyboard and a screen. It is observed that the presence of a screen is not strictly necessary if the workstation is exclusively used by visually handicapped persons. However, in practice, a screen is nevertheless present, normally, on which the information to be inputted or modified by means of the keyboard can be rendered visible, so that the workstation also remains suitable for persons who are not visually handicapped, who have no command of braille.

A workstation of the above-described type is known from practice. As an example, the workstation described in European patent application 0 284 113 can be mentioned.

During text processing, it regularly occurs that cursor movements are necessary for introducing changes in the text inputted. Normally, the control of the cursor takes place by means of operation of the keyboard or a mouse. The braille cells of the reading line are adapted to indicate the position of the cursor. A person who is not visually handicapped can see directly on the screen where the cursor is located and can also directly follow it visually when it is being relocated.

However, a visually handicapped person must relocate the cursor via the keyboard or the mouse, and must also move his or her hands from the keyboard to the braille reading line each time in order to check the cursor's exact position. This means that during the relocation of the cursor, the braille reading line should sometimes be scanned a large number of times, wholly or partly, which is relatively laborious and, at any rate, does not result in an optimum control convenience.

In European patent application 0 284 113, a solution to this problem is provided by additional cursor control means which are arranged adjacent the braille reading line and which can be operated by a visually handicapped person without the orientation of the hand relative to the braille line being lost.

Although the workstation as described in this European patent application meets the problems outlined hereinabove, the advancing technology has meanwhile given rise to new problems. The modern computers and in particular the programs run on these computers comprise a number of facilities and control possibilities that cannot be used, or only with great difficulty, by a visually handicapped person. In this connection, one may for instance think of programs wherein colors displayed on a color monitor have a specific meaning. In that case, information is transferred to a user by means of colors. For instance, a text block can be marked by giving the background of the text block a particular color. Likewise, it can be indicated that a specific portion of a text will be printed in bold type by giving the characters of this text passage a specific color. However, a visually handicapped person cannot read these colors from the braille reading line.

However, reading colors is not the only problem. The fact that many programs are run under Windows nowadays, so that many functions can be performed by means of the mouse, involves problems as well. An example is the so-called 'dragging' of an icon by means of the mouse. For dragging, the cursor of the mouse is positioned on the icon to be dragged, a switch of the mouse is energized, and the mouse is displaced so that the icon is shifted to a desired position, after which, finally, the switch of the mouse is released. Such an operation, too, can hardly be performed, if at all, by a visually handicapped person.

The object of the invention is to provide a solution to these problems, and the invention is characterized in that the workstation further comprises a second switch device comprising a number of switch elements located side by side, the second switch device being provided in or parallel to the braille reading line, so that the first and the second switch device can each be operated by a visually handicapped person without the orientation of the hand relative to a braille cell of the braille reading line being lost.

Hereinafter, the invention will be further described with reference to the accompanying drawings.

FIG. 1 schematically shows a workstation comprising a braille reading line and illustrates the basic principle of the invention;

FIG. 2 schematically shows, in top plan view, a braille reading line with an example of associated switch devices according to the invention;

FIGS. 3 and 4 schematically show an exemplary embodiment of a switch device according to the invention.

FIG. 1 schematically shows a workstation 1 for visually handicapped persons. The workstation 1 comprises a schematically indicated keyboard 2 which forms part of, for instance, a personal computer or a computer terminal or a word processor. In this example, the keyboard 2 is coupled to a personal computer 3. The workstation further comprises a mouse 4 connected to the personal computer 3. By means of the keyboard, text and other information can be inputted into a memory, or information already inputted can be changed. The keyboard comprises the usual keys required for this, of which only some keys, schematically indicated at 5, are shown.

The information inputted can be made visible on the screen 6 of a color monitor 7. Because the workstation comprises a color monitor, the color in which information is displayed can also have a meaning. For instance, a passage of a text can be marked by giving the background of this passage of a text a predetermined color that differs from the background of the rest of the screen. The characters themselves can also be displayed in a particular color having a predetermined meaning. For instance, a character that is to be printed in italics can be displayed in blue. In addition, the shape of a character or the intensity at which a character is displayed can have a predetermined meaning to a user.

Apart from the conventional character keys, the keyboard comprises one or more likewise conventional cursor control keys; serving to move the cursor or running indicator K, which is normally located on the screen at the position where the inputting of information is to be continued and travels along automatically with the inputting of information (or the deletion thereof), to another position on the screen. In addition, the cursor K can be moved to a particular position on the screen through the control of tie mouse 4. Moreover, it is possible that the program activated in the personal computer 3 displays an additional cursor X that can be controlled by the mouse. Hence, the position of this cursor X can be manipulated by moving the mouse.

To provide that inputted information can also be read back by visually handicapped persons, a braille reading line 8 is present, in this example provided at some distance before the conventional space bar S of the keyboard 2.

The braille reading line can be directly built into the console of the workstation, but it can also be a separately connectable, beam-shaped module 9, as shown in FIG. 1. The keyboard 2 and the module 9 can also be accommodated in a housing. The braille reading line comprises a number of braille cells 8a . . . 8n, disposed side by side and each consisting of a group of pins or the like that can separately be moved up and down, and by means of which braille signs can be formed.

Preferably, the number of braille cells corresponds to the number of characters that can be displayed on a line of the screen.

By means of suitable keys, the braille reading line can be brought into alignment with any line of the screen and is coupled to the word processor or computer so that the pins of the braille cells are brought into a position corresponding to the information represented on the screen on the selected line.

In this manner, a visually handicapped person can read the information on the screen via the braille reading line.

Further, the braille reading line is adapted to indicate the momentary location of the cursors K and X by means of fixed positions in each braille cell, i.e. all braille cells have pins in the same positions, which move upwards if the relevant cursor position corresponds to the location of the relevant braille cell in the information line which is represented by the braille reading line at that moment. A different representation of the cursor position by the braille cells is also possible, for instance through simultaneous up and down movement of all pins of a cell.

Between the braille reading line and the keyboard, some space is necessarily present. This means that if, during the scanning of the screen, one wishes to direct the cursor K and/or X to a specific location by means of the braille reading line, one hand or both hands should be moved from the reading line to the keyboard for operating the cursor control keys. This involves the contact with the reading line being lost, so that, for checking the momentary position of the cursor, the hands should be moved again to the braille reading line, which should then be read at least partly until the cursor position has been found. In general, this process should be repeated a few times, until the cursor has exactly reached the desired position. Also, information can be displayed on the color monitor 7 that cannot be transferred to a user by the braille reading line. This concerns the colors of the image, the shapes of the displayed characters, icons, etc.

According to the invention, however, first and second switch devices are present, positioned and designed so that for operating these first and second switch devices, the contact with the braille reading line need hardly be broken, if at all.

FIG. 1 illustrates the principle of the invention. Along the top side of the braille reading line 8, the first switch device 11 extends, which has the same length as the braille reading line and can be operated by means of each section located next to a braille cell of the braille reading line. Further, along the bottom side of the braille reading line 8, the second switch device 12 extends, which has the same length as the braille reading line and can be operated by means of each section located next to a braille cell of the braille reading line.

The first and second switch devices 11, 12 can be located on both sides of the braille reading line, as shown, but can also be provided below the braille reading line or between the braille reading line and the space bar. The first and second switch devices can also be provided in the braille reading line.

FIG. 2 again shows the braille reading line of FIG. 1 and the first and second switch devices 11, 12 extending on either side of the braille reading line. The switch devices 11, 12 are schematically shown in FIGS. 1 and 2, each being built tip from a number of switches a . . . n, with each switch located opposite a corresponding braille line 8a . . . 8n of the braille reading line 8.

Hence, from any location of the braille reading line, each of the switch devices 11, 12 can readily be operated by a slight displacement of the finger. This displacement of the finger is very slight and should from each braille cell always be performed through the same distance and in the same direction. As a result, after operation of each of the switch devices, the finger can easily be returned again into the starting position on the braille reading line and, in practice, the orientation of the user on the braille reading line is not lost.

The switch devices 11 and 12 can for instance be used as follows.

The switch device 11 can be coupled to the cursor and mouse control members of the workstation that are already present, in such a manner that, when a random switch is operated, the cursor K and/or X first jumps to the beginning of the line that is represented by the braille reading line at that moment, and then moves stepwise along the characters of the line as long as a switch of the switch device is retained. As soon as the user feels, via the braille reading line, that the cursor has reached the desired position, the switch is released, or reset if the switch has two discrete positions.

In such an embodiment, all switches of the switch device 11 have in fact the same function. Hence, in that case, all switches can be completely coupled to each other and even be replaced by a single combined switch. Such a combined switch can for instance be an elongated pressure switch, having a similar shape as the space bar of the keyboard, and. disposed so that the switch can for instance be operated by the thumb of a hand placed on the braille reading line. In that case, the switch device need not necessarily be disposed directly next to the braille reading line and can even be divided into a number of discrete, distributed switches, so that in each position of the hand on the braille reading line, one of the switches can be operated by the thumb or another free finger of the same hand. Operation by the other hand is possible as well.

It is observed that the workstation can be designed so that separate means are present for moving the cursor to the beginning of the information line represented by the braille reading line. In that case, that function does not have to be performed by the switch device 11 anymore.

Preferably, the switch device is designed so that each switch unequivocally corresponds to one of the braille cells, as is the case in the configuration shown. The switch device is coupled to the cursor control, already present, of the workstation in such a manner that when a particular switch or a particular section of the switch device is operated, the cursor K and/or X is directly relocated to that position on the screen that corresponds to the braille cell associated with the switch or section operated.

In this manner, the cursor K and/or X can be relocated still more quickly and effectively, without a switch having to be retained or reset. In the configuration shown in FIG. 2, this means that when the switch or section 11a is operated, the cursor K and/or X moves directly to the location corresponding to the braille cell 8a. When the switch or section 11s is operated, the cursor K or X moves to the location corresponding to the cell 8s, etc.

In such an embodiment, a short distance between a braille cell and an associated switch or section of the switch device 11 is of great importance for an effective and easy operation, and a configuration of the type shown in FIG. 2 is preferred. What is discussed hereinabove in relation to the switch device 11 applies likewise to the switch device 12.

The switch device 12, too, can be used for controlling the cursor K or X. For instance, the switch device 11 can be used for controlling the cursor K, while the switch device 12 is used for controlling the cursor X. The switch device 11 then acts as an additional cursor control, while the switch device 12 acts as an additional mouse control. However, the program running on the computer can also be designed so that the switch device 12 acquires a specific function, different from the function of the switch device 11. For instance, if it is desired to know the color of the background on which a particular character is displayed on the screen, the finger can be moved down from the braille cell wherein the character in question is represented, to the corresponding section of the switch device 12. When the switch device 12 is thus operated, a speech synthesizer, known per se, of the computer 3 is activated, telling the color of the background of the character in question. Such application is particularly useful in word processing programs. In word processing programs, specific pieces of text that should for instance be deleted are often marked by means of a particular color of the background. By energizing a switch element of the switch device 12, which corresponds to the braille cell whose background color one wants to know, a user can retrieve this information without the orientation of the hand relative to the braille cell being lost.

By means of the keys 5, or by means of predetermined switch elements X, Y (in FIG. 1 shown for the switch device 12 only) of the switch device 11 or 12, a different function can be selected for, for instance, the switch device 12. For instance, the switch device 12 can be set so that the speech synthesizer indicates color in which the character selected by means of the switch device 12 is displayed. Likewise, the switch device 12 can for instance have a function wherein the speech synthesizer mentions the form of a character represented in a braille cell when the character in question is indicated by a corresponding switch element of switch device 12. In general, the switch device 11 will have the function of additional cursor control means. This may involve the cursor K as well as a separate cursor X of the mouse 4. Preferably, the switch device 12 will have a variable function that can be selected in advance, for instance by means of the keyboard 5 or the additional keys X and Y.

In the drawing, the mouse 4 further comprises a pressure switch 14. This pressure switch 14 is for instance used for dragging text blocks or icons. In that case, for dragging an icon, the mouse 4 is for instance manipulated so that the cursor X on the screen coincides with the icon to be dragged. Then, the switch 14 is depressed and the mouse is displaced to a desired position for the icon. Next, the switch 14 is released, after which the icon stays at the position intended therefor. This function can advantageously be taken over by a combination of the first and second switch devices 11 and 12. For this purpose, the braille line 8 can be controlled in a manner known per se, enabling the user to recognize at which position of the screen an icon is located. When a user has selected an icon by means of the braille line 8, he moves his finger, which detected the icon, upwards to energize the switch device 11. The effect is that the cursor X is placed on the selected icon. Next, a user moves his finger downwards over the braille line 8 to the second switch device 12. When the second switch device 12 is thus activated, the result is comparable with the operation of the switch 14 of the mouse. Next, the user selects the desired position of the icon by means of the braille line 8. For this purpose, it may be necessary to select a specific line that should be represented on the braille line 8, as discussed hereinabove. After the desired line has been represented on the braille line 8 and after the desired position within this line, i.e. the desired braille cell on which the icon should be represented, has been found by a user, the user moves his finger upwards and energizes the switch device 11. As a result, the icon is dragged to the desired position. When the user then moves his finger downwards across the braille cell for checking the correct position, to subsequently operate the second switch device 12, this last will have the effect that the icon is fixed at the selected position. This last operation corresponds to the release of the switch 14 of the mouse 4.

In FIGS. 1 and 2, the switch devices 11 and 12 are shown as a series of discrete switches. It is indeed possible to us discrete (miniature) switches. Further, switches with two discrete positions as well as switches with a single rest position can be used. The switches can further be of any conventional type, such as rocker switches, pressure switches capacitive switches, touch switches, etc.

Preferably, the switch device is flat and strip-shaped, permitting the switch device to be provided on an existing braille reading line in a relatively simple manner.

An example of a suitable construction of a switch device is schematically shown, in section, in FIG. 3. FIG. 3 shows a laminated assembly of a first conductive sheet 30 and a second conductive sheet 31. Arranged between the sheets 30 and 31 is a non-conductive sheet 32 provided with openings. If a finger is pressed on the sheet 30, this sheet will be pressed with some force against the sheet 32 having openings, and establishes, via one or more openings in the sheet 32, an electric contact with the sheet 31, as indicated in FIG. 4 at the arrow 33. It is observed, that in a practical embodiment, the sheets 30, 32 and 31 do not have an interspace as in FIG. 3, but lie on top of each other as in FIG. 4. Via a schematically shown connector 34, the sheets are electrically connected to a signal-processing device, not shown. Further, the sheets 30, 31 have their top side and bottom side respectively covered with an electrically insulating sheet. Alternatively, the sheets 30, 31 can be designed so as to be conductive on one side only, for instance by a thin layer of conductive material provided thereon.

If at least one of the sheets 30, 31 has a predetermined resistance per unit of length, the current through the switch devices 11 and 12 is at any moment proportional to the location of depression of the switch devices 11 and 12, and the associated braille cell can be identified in a simple manner.

It is also possible to provide a number of conductive tracks, for instance seven, on one of the sheets, which conductive tracks constitute a number of contacts at the location of each braille cell. The contacts can again be brought into electric contact with the other sheet by depressing the top sheet. The specific combination of contacts then determines unequivocally the associated braille cell, so that the necessary control signals can be formed in a simple manner by the signal processing device.

It will be understood that the invention is by no means limited to the above-described uses of the first and second switch devices. For instance, the switch device 12 can of course also be used as additional cursor control means. It is also possible that neither of the two switch devices 11 and 12 are used as additional cursor control means. In that case, the two switch devices have different functions, like retrieving, by means of a speech synthesizer, the color of the background or the intensity at which a character or icon is displayed. In any case, it applies that it is at all times possible to activate two mutually different functions for one braille cell by the first and second switch devices. What these functions exactly are can be preset by a user.

In addition, the braille cells themselves can for instance be designed as switch devices, in that, when one or more upright pins are being pressed down, an electric signal is generated. Such modifications are understood to fall within the framework of the invention.

What is claimed is:

1. A workstation comprising a keyboard for inputting data, a braille reading line having a number of braille cells located side by side, and a first elongated switch device comprising a number of switch elements located side by side, wherein the first switch device is arranged parallel to the braille reading line, wherein said first switch device can be operated by a visually handicapped person, without the orientation of the hand relative to the braille reading line being lost, wherein the workstation further comprises a second elongated switch device comprising a number of switch elements located side by side, wherein the second switch device is arranged parallel to the braille reading line, wherein said second switch device is arranged to be operated by a visually handicapped person, without the orientation of the hand relative to the braille reading line being lost wherein the longitudinal direction of the first and the second switch device extend parallel to the longitudinal direction of the braille reading line, wherein two mutually different functions for one braille cell are arranged to be activated by the first and second switch devices and wherein the station further includes a speech synthesizer controlled by at least one of the two switch devices.

2. A workstation according to claim 1, wherein, in use, the first or second switch device acts as a cursor control.

3. A workstation according to claim 1, wherein, in use, the first or second switch device acts as a mouse control.

4. A workstation according to claim 1, wherein, in use, a number of the switch elements of the first and the second switch device each act as a key for activating a predetermined function associated with a braille cell.

5. A workstation according to claim 1, wherein, in use, the first or second switch device act as a mouse control, wherein the first switch device controls the position of the cursor of the mouse, while the second switch device acts as a button of the mouse.

6. A workstation according to claim 1, wherein, in use, one of the two switch devices acts as a cursor control, while the other switch device acts as a control of a predetermined function.

7. A workstation according to claim 6, wherein the station comprises buttons for selecting the function.

8. A workstation according to claim 1, wherein each switch element of the first switch device unequivocally corresponds to a braille cell.

9. A workstation according to claim 1, wherein each switch element of the second switch device unequivocally corresponds to a braille cell.

10. A workstation according to claim 1, wherein each braille cell of the braille reading line unequivocally corresponds to a switch element of the first switch device and a switch element of the second switch device.

11. A workstation according to claim 1, wherein the first or second switch device is used for outputting information from the workstation.

12. A workstation according to claim 1, wherein the braille reading line, the first switch device and the second switch device are arranged on the keyboard.

13. A workstation according to claim 1, wherein the braille reading line, the first switch device and the second switch device are in a module separate from the keyboard.

14. A workstation comprising a keyboard for inputting data, a braille reading line having a number of braille cells located side by side, and a first elongated switch device comprising a number of switch elements located side by side, wherein the first switch device is arranged parallel to the braille reading line, wherein said first switch device is arranged to be operated by a visually handicapped person, without the orientation of the hand relative to the braille reading line being lost, wherein the workstation further comprises a second elongated switch device comprising a number of switch elements located side by side, wherein the second switch device is arranged parallel to the braille reading line, wherein said second switch device is arranged to be operated by a visually handicapped person, without the orientation of the hand relative to the braille reading line being lost wherein the longitudinal direction of the first and the second switch device extends parallel to the longitudinal direction of the braille reading line, and wherein two mutually different functions for one braille cell are arranged to be activated by the first and second switch devices, and wherein, in use, a number of the switch elements of the first and the second switch device each act as a key for activating a predetermined function associated with a braille cell, wherein the first switch device controls the cursor of the mouse and the second switch device is a button of the mouse.

15. A workstation according to claim 14, wherein, in use, the first or second switch device acts as a cursor control.

16. A workstation according to claim 14, wherein, in use, the first or second switch device acts as a mouse control.

17. A workstation according to claim 14, wherein, in use, a number of the switch elements of the first and the second switch device each act as a key for activating a predetermined function associated with a braille cell.

18. A workstation according to claim 14, wherein the station comprises buttons for selecting the function.

19. A workstation according to claim 14, wherein each switch element of the first switch device unequivocally corresponds to a braille cell.

20. A workstation according to claim 14, wherein each switch element of the second switch device unequivocally corresponds to a braille cell.

21. A workstation according to claim 14, wherein each braille cell of the braille reading line unequivocally corresponds to a switch element of the first switch device and a switch element of the second switch device.

22. A workstation according to claim 14, wherein the first or second switch device is used for outputting information from the workstation.

23. A workstation according to claim 14, wherein the station further comprises a speech synthesizer controlled by at least one of the switch devices.

24. A workstation according to claim 14, wherein the braille reading line, the first switch device and the second switch device are arranged on the keyboard.

25. A workstation according to claim 14, wherein the braille reading line, the first switch device and the second switch device are in a module separate from the keyboard.

* * * * *